June 13, 1950 W. H. PHELPS 2,511,124
GUARD FOR POWER MOWING MACHINES
Filed June 10, 1946 2 Sheets-Sheet 1

INVENTOR.
William H. Phelps
BY
Chritton, Schroeder, Merriam & Hofgren
Attorneys

June 13, 1950 W. H. PHELPS 2,511,124
GUARD FOR POWER MOWING MACHINES
Filed June 10, 1946 2 Sheets-Sheet 2
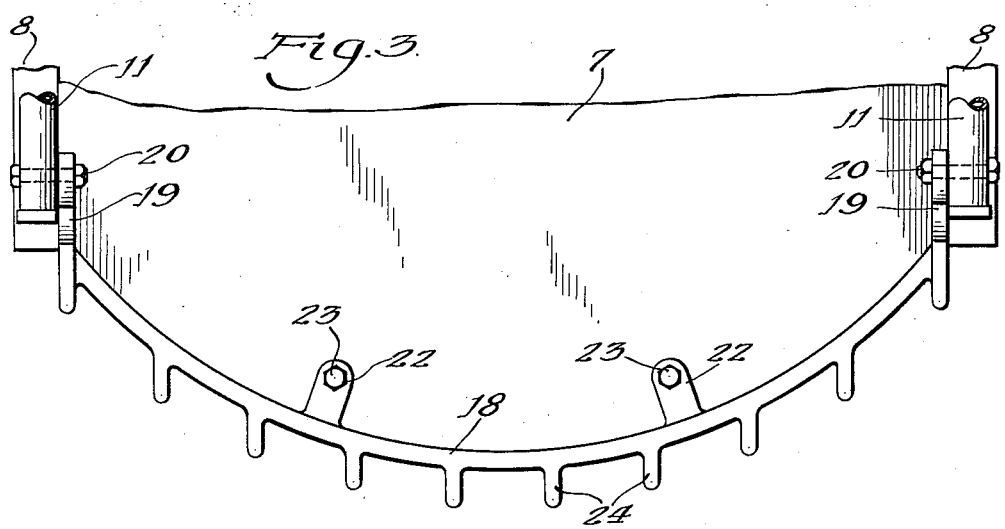
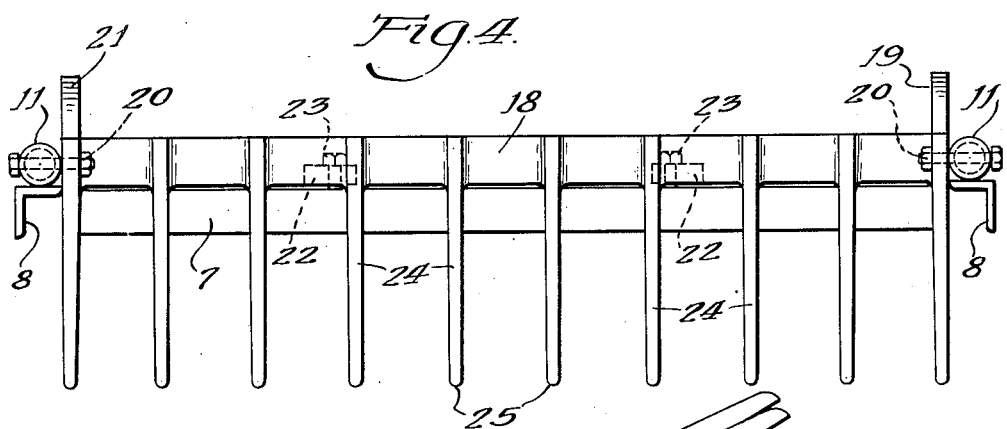
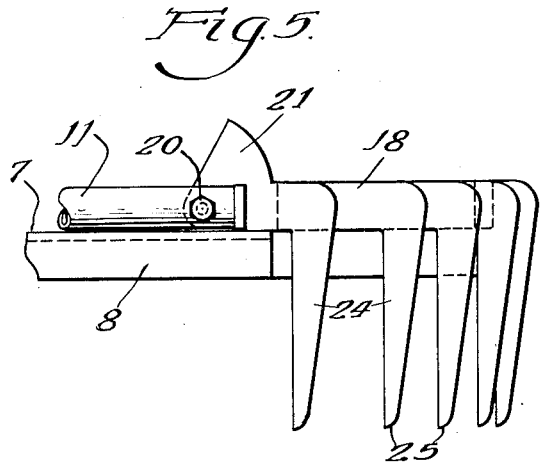
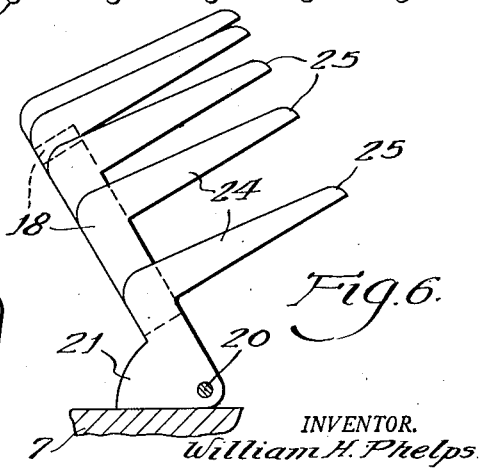
INVENTOR.
William H. Phelps
BY
Attorneys Patented June 13, 1950

2,511,124

UNITED STATES PATENT OFFICE 2,511,124

GUARD FOR POWER MOWING MACHINES

William H. Phelps, Ralston, Nebr.

Application June 10, 1946, Serial No. 675,769

4 Claims. (Cl. 56—25.4)

This invention relates to a guard for a power mowing machine wherein the cutter blade operates in a horizontal plane.

The primary object of the invention is to provide a durable and effective guard for a high speed cutter blade which will prevent injury to persons around the machine and will not interfere with effective operation of the cutter.

In mowing machines having a horizontal blade operating at high speed there is some danger of a person accidentally putting his foot under the front end of the platform and coming in contact with the heavy blade, which might cause severe injury. Also, the blade might come into contact with a stone, bottle, or piece of wood and cause the same to be thrown violently away from the front of the machine. Ordinary guards have not been found practical, because of their tendency to bend over the grass or vegetation and interfere with the free and unrestricted flow of air which will prevent the vegetation from standing up where it will be engaged by the cutter.

Another object of the present invention is to provide a pivotally mounted guard which not only serves as a bumper and safety device, but is so shaped that the pressure of heavy vegetation will have a tendency to push it upward, so that it will not prevent the advance of the machine. The guard is also provided with stops so that it may be swung over the center of the pivots and will rest in an inclined inoperative position when the machine is being operated to cut tall weeds, and the like.

The invention is illustrated in a preferred embodiment in the accompanying drawings, in which—

Figure 1:
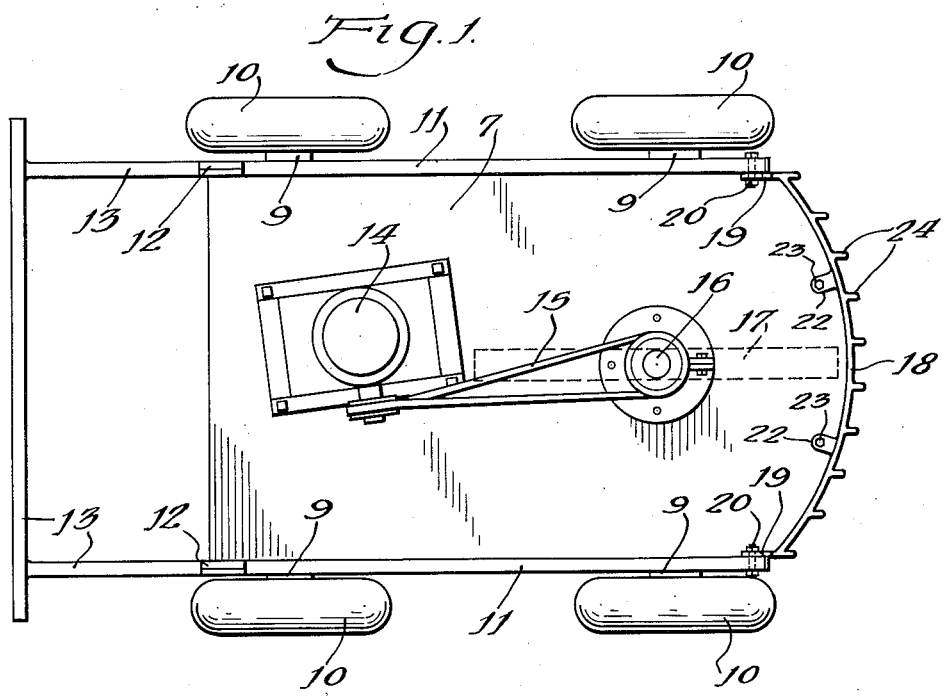
Figure 2:
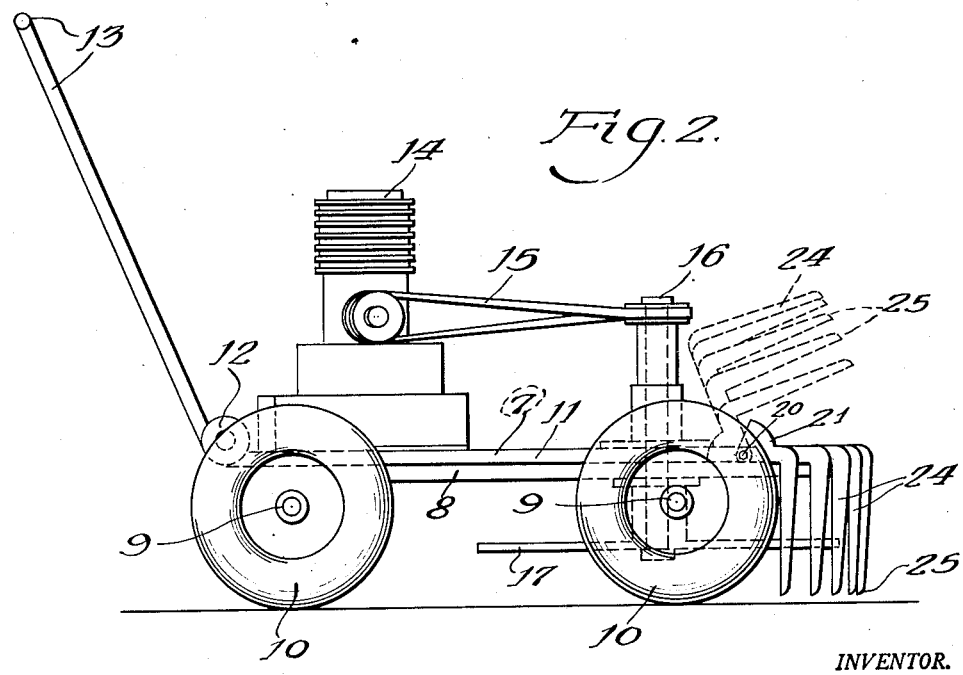

Figure 1 is a plan view of a machine embodying the invention; Fig. 2, a side elevational view of the same, and showing in dotted lines how the guard may be turned back out of operative position; Fig. 3, an enlarged fragmentary top plan view of the guard, showing how the guard is mounted on the platform; Fig. 4, a front elevational view of the same guard; Fig. 5, an enlarged fragmentary side elevational view of the guard; and Fig. 6, an enlarged side elevational view, showing the stops for limiting the backward movement of the guard.

In the embodiment illustrated, a mowing machine is shown with a platform 7 provided at its edges with longitudinally extending angle bars 8, and carried by axles 9 on wheels 10. A pair of tubular bars 11 are secured to the platform and extend rearwardly to make an adjustable pivotal connection 12 with a handle bar 13. A gasoline power motor 14 is mounted on the platform, and by means of a belt 15 drives a shaft 16, provided at its lower end with a cutter bar 17.

The guard has an arcuate body member 18, provided at its rear end with arms 19, which make pivotal connections 20 with the tubular members 11. The arms 19 are provided with stops 21 which are adapted to engage the platform and limit the rearward travel of the guard member when it is turned up into inoperative position, as shown in Fig. 6, or by the dotted lines in Fig. 2. The body member is also shown provided with a pair of rearwardly extending fingers 22, which are adapted to rest on the front of the platform and support the guard in operative position. If desired, the fingers may have tapped holes to receive adjusting bolts 23, so that the height of the guard in operative position may be adjusted.

The body member is provided with a series of spaced tines 24 which extend downwardly and terminate in rounded points 25. The tines are tapered upwardly so that contact with heavy vegetation will tend to raise the guard upwardly out of operative position, but the guard will be free to drop back by gravity when the vegetation is less heavy. As best shown in Figs. 3 and 4, the tines have equal transverse spacing, so that the same amount of opening is left for vegetation to enter under the platform between each adjacent pair of tines.

The operation will be readily understood. When the guard is in operative position, as shown in Fig. 2, vegetation may enter through the guard to a position under the platform and be engaged by the cutter bar. If the vegetation is so high that the guard interferes, it may be swung back into the position shown in Fig. 6.

The foregoing detailed description is given for clearness of understanding only, and no unnecessary limitations should be understood therefrom, for some modifications will be obvious to those skilled in the art.

I claim:

1. A guard for the front of a mowing machine having a platform mounted on wheels and a motor on the platform for driving a cutter blade in a horizontal plane, comprising: a transversely elongated, narrow, forwardly curved, arcuate, rigid body member having downwardly extended sturdy tines spaced apart substantially equal distances laterally of the machine, the front edges of the tines being downwardly and rearwardly inclined and terminating in rounded bottom ends curved rearwardly, the lateral ends of the body member each having a straight, rearwardly extending arm fixed thereto, said arms being mounted on said platform, and the bottom edge of said body member falling in approximately the same plane as the main top surface of the platform.

2. A guard for the front of a mowing machine having a platform mounted on wheels and having upstanding members at the front of its lateral sides and a motor on the platform for driving a cutter blade in a horizontal plane, comprising: a transversely elongated, narrow, forwardly curved, arcuate, rigid body member having downwardly extended sturdy tines spaced apart substantially equal distances laterally of the machine, each of said tines having a front edge downwardly and rearwardly inclined and terminating in a rounded bottom end curved rearwardly, the lateral ends of the body member each having a rearwardly extending arm pivotally connected to one of said upstanding members on the platform, so that the guard and its tines may be swung upwardly above the platform, the pivotal mounting of said arms with the platform upstanding members being to the rear of the adjacent portions of the platform front edge and above the main upper surface of the platform, whereby when the guard is in lowered position the bottom edge of each of said arms may contact the upper surface of the platform.

3. A mowing machine guard as claimed in claim 2, in which each of said arms is formed with an angularly inclined edge forming an angle with the plane of the platform of more than ninety degrees when the guard is lowered, so that when the guard is swung upwardly and rearwardly to its limit said body member will occupy an inclined position to the rear of a vertical plane passing through the pivot axes to hold the guard by gravity in inoperative position.

4. A mowing machine guard as claimed in claim 3, in which a rearwardly extending sturdy finger is fixed to the body member, and an adjusting screw is threadably mounted in said finger to bear against the platform to adjust the height of the lowered guard with relation to the platform.

WILLIAM H. PHELPS.

REFERENCES CITED

The following references are of record in the file of this patent:

UNITED STATES PATENTS

| Number | Name | Date |
|---|---|---|
| 758,080 | Johnson | Apr. 26, 1904 |
| 1,849,953 | Phalen | Mar. 15, 1932 |
| 2,017,524 | Bolens | Oct. 15, 1935 |
| 2,157,620 | McGrath et al. | May 9, 1939 |